United States Patent [19]
Holt

[11] 3,751,674
[45] Aug. 7, 1973

[54] CIRCUIT ARRANGEMENT FOR USE WITH VEHICLES SAFETY ARRANGEMENT

[75] Inventor: William David Holt, Colne, England

[73] Assignee: Joseph Lucas (Industries) Limited, Birmingham, England

[22] Filed: Mar. 6, 1972

[21] Appl. No.: 232,127

[30] Foreign Application Priority Data
Mar. 12, 1971 Great Britain...................... 6,798/71

[52] U.S. Cl......... 307/10 SB, 340/52 E, 340/278.1, 200/DIG. 1, 180/82
[51] Int. Cl............................................. H02g 3/00
[58] Field of Search.............. 340/52 E, 279, 278.1, 340/278; 200/DIG. 1; 307/10 R, 10 SB; 180/82

[56] References Cited
UNITED STATES PATENTS
2,031,226  2/1966  Parvin........................... 200/DIG. 1
3,455,410  7/1969  Wilson............................... 340/278

Primary Examiner—Herman J. Hohauser
Attorney—Holman & Stern

[57] ABSTRACT

A circuit arrangement for use with a vehicle safety harness includes an alternating signal generator and a pair of conductors respectively in an associated vehicle seat and a part of the harness, these conductors forming capacitor plates between which alternating current flows only when the harness is in position on an occupant of the seat. A switching circuit is responsive to this current flow and also to the closure of a switch associated with the harness buckle to complete a circuit to the vehicle starter.

18 Claims, 3 Drawing Figures

CIRCUIT ARRANGEMENT FOR USE WITH VEHICLES SAFETY ARRANGEMENT

This invention relates to an arrangement for preventing a vehicle engine from being started unless safety harness for the occupants of the vehicle is in position.

According to the invention an arrangement as above defined comprises means for generating an alternating signal, a first electrical conductor associated with a seat of the vehicle and acting as one plate of a capacitor, a second electrical conductor carried by the safety harness associated with said seat and acting as another plate of the capacitor, the body of an occupant of the seat providing, when within the harness, a dielectric to cause an alternating current flow from said generating means through said capacitor, said signal generating means being connected to one of said plates, first switching means operable by interengagement of parts of the harness, and second switching means operable to complete a circuit to a starting device for the vehicle only when there is an alternating current flow through said capacitor and when said first switching means is operated.

An arrangement according to the invention will now be described by way of example and with reference to the accompanying drawings in which.

Figure 1:
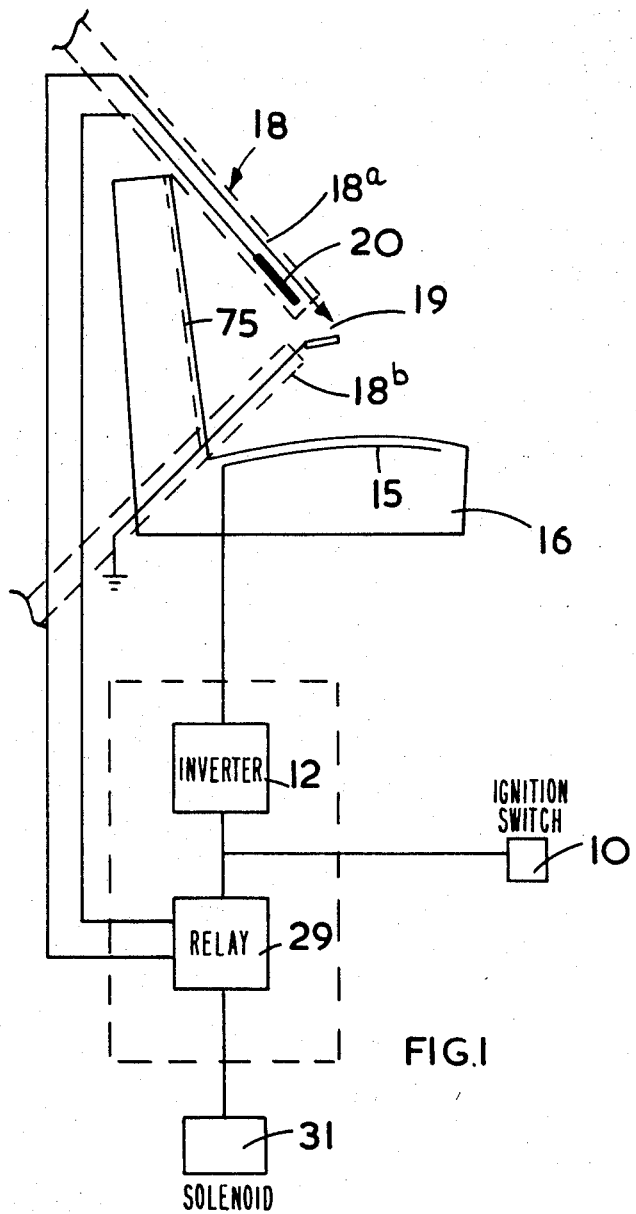
FIG. 1 shows diagrammatically a general layout of the arrangement.
Figure 2:
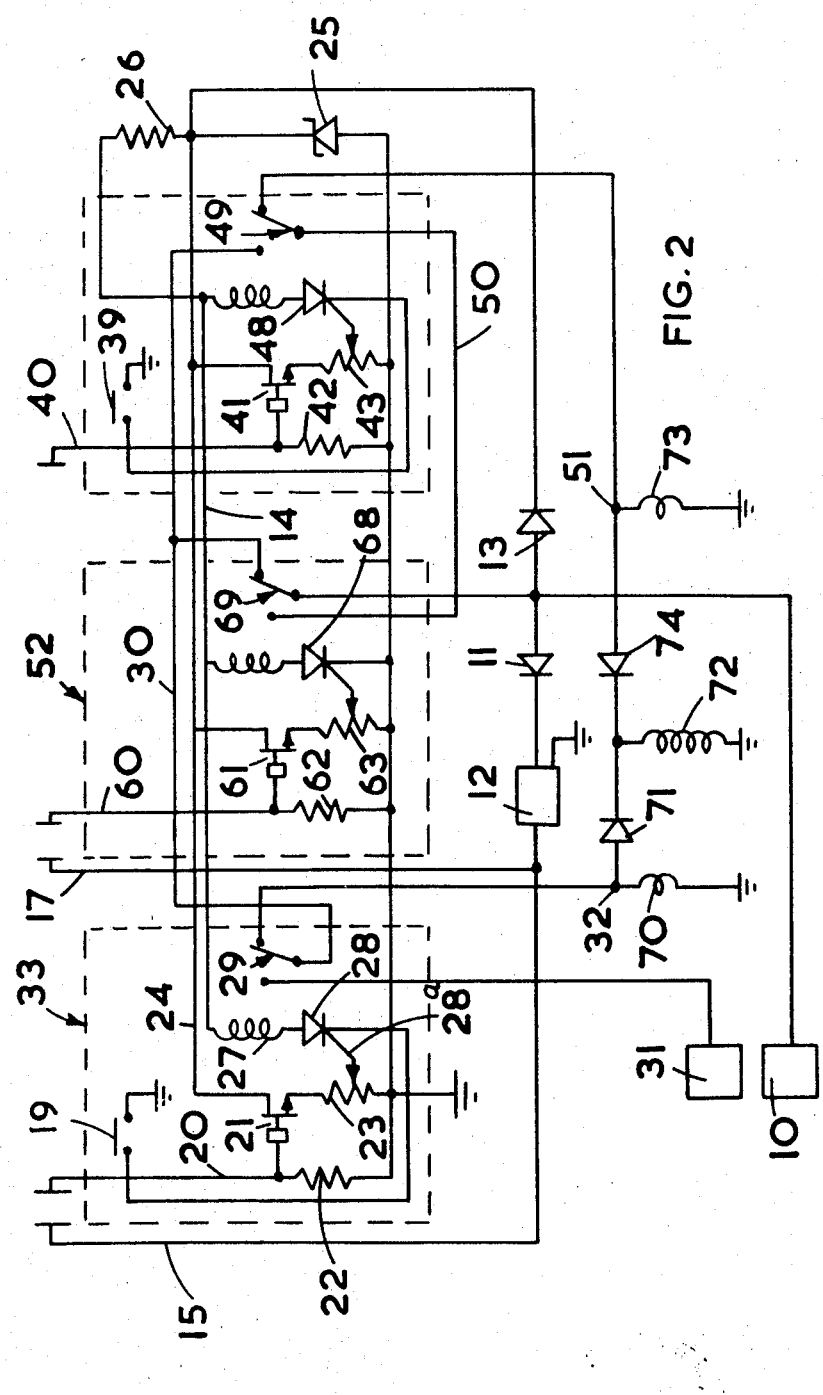
FIG. 2 is a circuit diagram of the arrangement.

The 'start' terminal of a road vehicle engine ignition switch 10 is connected so as to provide a 12 volt supply via a diode 11 to an inverter 12 and also via a diode 13 to a rail 14. Inverter 12 is adapted to provide an output signal of 250 volts at 5 Khz. The inverter output is connected to a conductor 15 within the driver's seat 16 (FIG. 1) on the vehicle. In parallel with conductor 15 is an identical conductor 17 in the passenger's seat (not shown).

Associated with the driver's seat 16 is a safety harness 18 in two parts 18a, 18b adapted to be connected by a catch or buckle. Associated with the harness catch is a switch 19 through which a circuit is completed only when the harness portions are interconnected. Within the harness part 18a is a conductor 20 which is connected to the gate of a field effect transistor 21 and also, via a resistor 22 to earth. The source of transistor 21 is connected to earth via the resistive portion of a potentiometer 23. The drain of transistor 21 is connected to a rail 24 which is, in use, maintained at a potential of 6 volts above earth by a Zener diode 25, the potential on rail 24 being derived via resistor 26 from rail 14. An electro-magnet 27 is connected via a thyristor 28 and switch 19 to earth, the gate connection 28a of thyristor 28 being connected to the wiper of potentiometer 23. Electro-magnet 27 forms part of a switching relay 29 which in its operated condition completes a connection between a line 30 and a starter solenoid 31 for the engine. In its normal, inoperated, condition relay 29 completes a connection between line 30 and a terminal 32.

Switch 19, conductor 20, transistor 21, resistors 22, 23 thyristor 28 and relay 29 combine to form a switching assembly indicated generally at 33. An identical switching assembly 34 is provided in association with a passenger's seat and harness (not shown). Switching assembly 34 comprises switch 39, conductor 40, transistor 41, resistors 42, 43, thyristor 48 and relay 49 corresponding to the components of assembly 33. In its operated condition relay 49 completes a circuit between line 30 and a line 50. In its normal, unoperated, condition relay 49 completes a circuit between line 50 and a terminal 51.

A third switching assembly, indicated generally at 52 is generally similar to assemblies 33, 34 but includes no switch corresponding to switches 19, 39 but includes corresponding conductor 60, transistor 61, resistors 62, 63 thryistor 68 and relay 69. Relay 69 provides, in its operated condition a connection between switch 10 and line 50, and in its normal, unoperated condition, a connection between switch 10 and line 30. Conductor 60 is situated within the passenger's seat adjacent conductor 17, and conductor 40, in assembly 34, lies within the passengers harness in a like manner to conductor 20 in the drivers harness.

Terminal 32 is connected via a lamp 70 to earth and via a diode 71 and a buzzer 72 to earch. Terminal 51 is connected via a lamp 73 to earth and via a diode 74 to the junction of diode 71 and buzzer 72. The backs of the driver's and passenger's seats include an earthed mesh 75 whose purpose will be latter explained.

In use, when the switch 10 is in the "start" position, inverter 12 supplies a 5 KHz signal to conductors 15, 17 in the driver's and passenger's seats respectively, conductors 15, 17 acting as one plate of a pair of capacitors. Conductor 60 forms a second plate of the capacitor of which conductor 17 forms one plate. If there is an occupant of the passenger's seat the resultant increase in the value of the capacitance between conductors 17, 60 causes a current to flow between them. This current is very small because of the low value of this capacitance. During positive half-cycles of current in conductor 60, transistor 61 conducts to enable a voltage to be picked up from potentiometer 63, enabling thyristor 68 to switch on and current to pass through the coil of relay 69. Relay 69 remains operated through negative half cycles of current in conductor 60, by virtue of the latching action of thyristor 68, which remains conductive until its anode-cathode circuit is broken.

When relay 69 is operated, there is no supply to line 30 from switch 10 unless relay 49 is also operated. Conductor 40 is switching assembly 34 provides a third plate for the capacitor of which one plate is formed by conductor 17, conductor 40 being, as previously indicated, in the passenger's safety harness. Switching assembly 34 operates in a like manner to assembly 52, provided that the harness is positioned on the passenger so that a current flows in conductor 40 and also provided that switch 39 is made by interengagement of the two harness portions.

If therefore, there is an occupant of the passenger's seat and the associated harness is properly secured, the supply from switch 10 passes via relays 69, 49 to line 30. If there is no occupant of the passenger's seat the supply from switch 10 passes directly to line 30.

Switching assembly 33 operates in the same way as assembly 34, relay 29 being operated only of the driver's harness is properly secured, so as to complete a circuit between line 30 and starter solenoid 31.

In the event that the passenger's seat is occupied but the associated harness is not secured, current is supplied via relays 69, 49 to terminal 51 to light lamp 73 and, via diode 74 to energise buzzer 72. Similarly if the driver's harness is not secured lamp 70 lights and buzzer 72 sounds.

Earthed mesh 75 in the backs of the respective seats ensures that if the harness portions are secured together and laid on the seats to lie behind the driver or passenger, the conductors 15, 17 respectively are effectively earthed.

In those circumstances no current will flow in conductors 20, 40 and the starter solenoid 31 will not be energised. Warning lights 70, 73 and buzzer 72 will, moreover, be operated.

Figure 3:
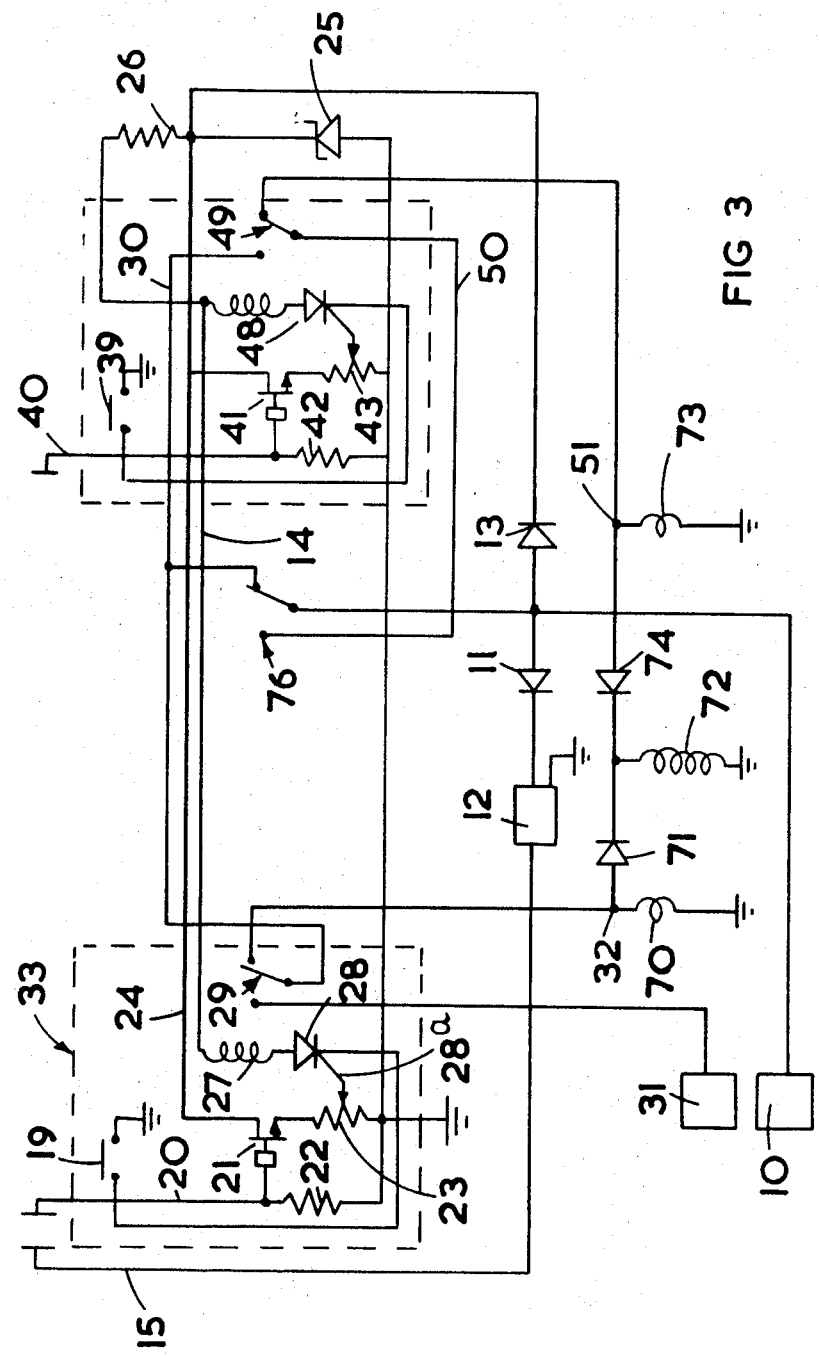
FIG. 3 is a circuit diagram of an alternative arrangement.

In the alternative arrangement shown in FIG. 3, the third switching assembly 52 is replaced by a switch 76 which is operated by the weight of an occupant of the passenger's seat. The operation of the arrangement is otherwise the same, and operates as before to prevent the engine from being started unless the safety harness is in position.

I claim:

1. An arrangement for preventing a vehicle engine from being started unless a safety harness for the occupants of the vehicle is in position, comprising means for generating an alternating signal, a first electrical conductor associated with a seat of the vehicle and acting as one plate of a capacitor, a second electrical conductor carried by the safety harness associated with said seat and acting as another plate of the capacitor, the body of an occupant of the seat providing, when within the harness, a dielectric to cause an alternating current flow from said generating means through said capacitor, said signal generating means being connected to one of said plates, first switching means operable by interengagement of parts of the harness, and second switching means operable to complete a circuit to a starting device for the vehicle only when there is an alternating current flow through said capacitor and when said first switching means is operated.

2. An arrangement as claimed in claim 1 in which said second switching means comprises an electro-magnetic relay, and there is provided third switching means responsive to said alternating current flow to cause said relay to be energised.

3. An arrangement as claimed in claim 2 in which said third switching means is a thyristor.

4. An arrangement as claimed in claim 3 which includes a transistor responsive to a half-cycle of said alternating current through said capacitor to apply a switching signal to the gate of said thyristor.

5. An arrangement as claimed in claim 2 in which the first switching means is in series with said third switching means.

6. An arrangement as claimed in claim 1 which includes a third electrical conductor associated with a further seat of the vehicle, a fourth electrical conductor carried by the safety harness associated with said further seat, said third and fourth conductors acting as first and second plates respectively of a further capacitor, an occupant of said further seat providing, when within the harness, a dielectric to cause an alternating current flow through said further capacitor, fourth switching means operable by the presence of an occupant of said further seat to prevent said second switching means from completing the circuit to said starting device, fifth switching means operable by interengagement of parts of the harness associated with said further seat, and sixth switching means operable in response to an alternating current flow between said first and second plates of said further capacitor and also when said fourth and fifth switching means are operated to enable said second switching means to complete the circuit to said starting device.

7. An arrangement as claimed in claim 6 in which said sixth switching means comprises a second electro-magnetic relay, and there is provided seventh switching means responsive to said current flow in said further capacitor to cause said second relay to be energised.

8. An arrangement as claimed in claim 7 in which said seventh switching means is a second thyristor.

9. An arrangement as claimed in claim 8 which includes a second transistor responsive to a half-cycle of said alternating current between said first and second plates of said further capacitor to apply a switching signal to the gate of said second thyristor.

10. An arrangement as claimed in claim 6 in which the fifth switching means is in series with the seventh switching means.

11. An arrangement as claimed in claim 6 in which said fourth switching means is responsive to the weight of an occupant of said further seat.

12. An arrangement as claimed in claim 6 which includes a fifth electrical conductor associated with said further seat and providing a third plate of said further capacitor, an occupant of said further providing, in use, a dielectric to cause an alternating current to flow between said first and third plates of said further capacitor, said fourth switching means being responsive to the current flow between said first and third plates.

13. An arrangement as claimed in claim 12 in which said fourth switching means is a third electro-magnetic relay and there is provided eighth switching means responsive to alternating current flow between said first and third plates to cause said third relay to be energised.

14. An arrangement as claimed in claim 13 in which said eighth switching means is a third thyristor.

15. An arrangement as claimed in claim 14 which includes a third transistor responsive to a half-cycle of said alternating current between said first and third plates to apply a switching signal to said third thyristor.

16. An arrangement as claimed in claim 1 which includes warning apparatus operable when the second switching means is not completing said circuit to said starting device.

17. An arrangement as claimed in claim 16 in which said warning apparatus comprises an electrically operated visual and audible warning devices.

18. An arrangement as claimed in claim 6 which includes a warning apparatus operable to provide an audible indication when either the second or the sixth switching means are not completing the circuit to said starting device, and a pair of electric lamps operable by the second and sixth switching means respectively when the latter are not completing the circuit to said starting device.

* * * * *